(12) United States Patent
Taneja et al.

(10) Patent No.: US 11,375,411 B2
(45) Date of Patent: Jun. 28, 2022

(54) RESOURCE UNIT SHARING

(71) Applicant: Cisco Technology, Inc., San Jose, CA (US)

(72) Inventors: Mukesh Taneja, Bangalore (IN); Sudhir K. Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 16/752,354

(22) Filed: Jan. 24, 2020

(65) Prior Publication Data

US 2021/0235327 A1    Jul. 29, 2021

(51) Int. Cl.
*H04W 28/26*    (2009.01)
*H04W 72/04*    (2009.01)
*H04L 5/00*    (2006.01)

(52) U.S. Cl.
CPC .......... *H04W 28/26* (2013.01); *H04L 5/0032* (2013.01); *H04W 72/048* (2013.01); *H04W 72/0446* (2013.01)

(58) Field of Classification Search
CPC ............. H04W 28/26; H04W 72/0446; H04W 72/048; H04W 72/0406; H04L 5/0032
See application file for complete search history.

(56) References Cited

U.S. PATENT DOCUMENTS

| 9,432,854 | B2 | 8/2016 | Abinader, Jr. et al. |
| 10,257,848 | B2 | 4/2019 | Sun et al. |
| 10,340,975 | B2 | 7/2019 | Silverman et al. |
| 2009/0059856 | A1* | 3/2009 | Kermoal ............... H04W 16/14 370/329 |
| 2013/0295948 | A1 | 11/2013 | Ye et al. |
| 2016/0353423 | A1* | 12/2016 | Li ......................... H04W 74/04 |
| 2018/0279156 | A1 | 9/2018 | Malik et al. |
| 2020/0076552 | A1* | 3/2020 | Cherian ............... H04L 5/0035 |
| 2021/0168712 | A1* | 6/2021 | Cherian ............... H04W 76/11 |
| 2021/0194659 | A1* | 6/2021 | Sevin ................... H04L 5/0032 |

FOREIGN PATENT DOCUMENTS

| EP | 3113530 A1 | 1/2017 |
| WO | 2018192444 A1 | 10/2018 |
| WO | 2019028265 A1 | 2/2019 |

OTHER PUBLICATIONS

PCT, Notification of Transmittal of The International Search Report and The Written Opinion of The International Searching Authority, or The Declaration for Application PCT/US2021/070067, dated May 17, 2021.

* cited by examiner

*Primary Examiner* — Jae Y Lee
*Assistant Examiner* — Aixa A Guadalupe Cruz
(74) *Attorney, Agent, or Firm* — Patterson + Sheridan, LLP (57) ABSTRACT

Resource Unit (RU) sharing between Access Points in a wireless network is provided by identifying a first Access Point (AP) associated with a first user device, wherein the first AP has won contention for a RU; identifying a second AP associated with a second user device, wherein the first user device and the second user device are located within an overlapping area served by the first AP and the second AP; identifying an unused portion of the RU to which the first AP has not scheduled traffic between the first AP and the first user device; and assigning the unused portion to the second AP for communication between the second AP and the second user device.

17 Claims, 8 Drawing Sheets

RESOURCE UNIT SHARING

TECHNICAL FIELD

Embodiments presented in this disclosure generally relate to wireless transmission management. More specifically, embodiments disclosed herein relate to managing the assignment of Resource Units (RU) for unused portions of a reserved RU to be made available for reservation by additional devices. Although the present disclosure generally provides examples for RUs of an unspecified time length and unspecified number of sub-channels or subcarriers (in which a given RU may be a different length of time or different number of sub-channels than a subsequent RU), the present disclosure is applicable to networking standards or deployments in which a specified time length or a specified number of sub-channels or subcarriers is applied to all or some of the RUs.

BACKGROUND

Wireless Access Points (APs) operating on the same spectrum reserve blocks of time and spectrum to communicate with user devices so that communications do not overlap and interfere with one another. These blocks of time and spectrum are generally referred to as RUs, and a given communications specification can define an RU to include various sub-channels and sub-times for specific communications tasks. For example, two uplink communications may occur at the same time within an RU on separate sub-channels, or on the same sub-channel at different times. An AP communicates the assignment of various times and channels to the user devices associated therewith so that the user devices respect the assignments chosen by the AP for a given RU. In various embodiments, when two or more APs neighbor one another, each AP may want to use the same RU. RUs may be won via a contestation process or assigned by a central network controller so that two APs do not attempt to use the same portion of spectrum at the same time.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method for RU sharing that includes: reserving, by a first Access Point (AP) a RU for use in an environment including an overlapping area served by the first AP and a second AP; assigning traffic between a first user device and the first AP in the RU; transmitting an invitation to the second AP that identifies an unused portion of the RU; assigning a sub-portion of the unused portion to the second AP; and transmitting the traffic to the first user device during the RU.

One embodiment presented in this disclosure provides a method for RU sharing that includes: receiving, at a first Access Point (AP) an invitation from a second AP that has reserved a channel for a time period to share an unused portion of the channel for the time period; reserving a sub-portion during the unused portion, wherein the sub-portion begins after the time period begins and ends at or before when the time period ends; and assigning traffic associated with the first AP to the sub-portion.

One embodiment presented in this disclosure provides a method for RU sharing that includes: identifying a first Access Point (AP) associated with a first user device, wherein the first AP has won contention for a Resource Unit (RU); identifying a second AP associated with a second user device, wherein the first user device and the second user device are located within an overlapping area served by the first AP and the second AP; identifying an unused portion of the RU to which the first AP has not scheduled traffic between the first AP and the first user device; and assigning the unused portion to the second AP for communication between the second AP and the second user device.

EXAMPLE EMBODIMENTS

The present disclosure provides improvements in channel usage, so that network deployments with more than one AP can more efficiently use the available bandwidth for communications. An AP that has won or been assigned an RU informs neighboring APs of any availability within the RU that the AP is willing to share. For example, a first AP can tell a second AP (directly or via a manager application) that an RU occupying channel 1 is reserved from time $t_1$ to $t_3$, but the first AP is only scheduled to use sub-channels 1-4; the second AP may use sub-channels 5-9 despite the first AP having reserved the RU. For example, the second AP can then use sub-channels 5-9 from time $t_2$ to $t_3$ so that the bandwidth in sub-channels 5-9 does not go to unused. Additionally, a first AP can allow access to the sub-channels for a subset of the reserved time so that a first AP can use the given sub-channel during one time period and a second AP can use that sub-channel for a different time period.

In Wi-Fi (e.g., the 802.11 family of standards set out by the IEEE (Institute of Electrical and Electronics Engineers)) and other contention based networking standards, each device contends to access the transmission medium. When a device "wins" contention for access to the transmission medium, the device may schedule transmissions to/from one or more other devices. Additionally, the time period won may be consistent between contentions (e.g., every winning device is assigned X milliseconds (ms) of access to the transmission medium) or may be variable between different contentions.

Figure 1A:
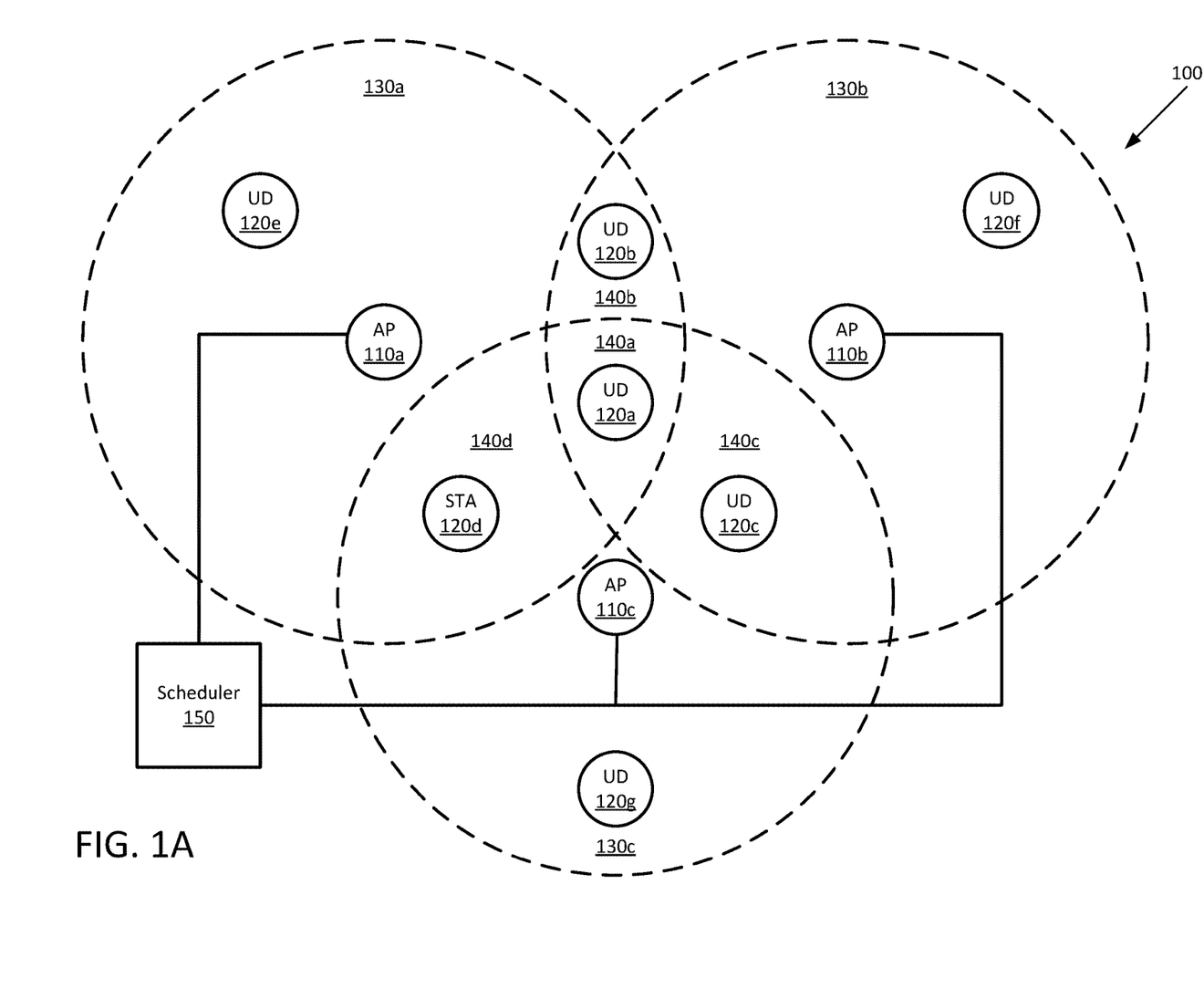
FIGS. 1A and 1B illustrate networking environments, according to embodiments of the present disclosure.
Figure 1B:
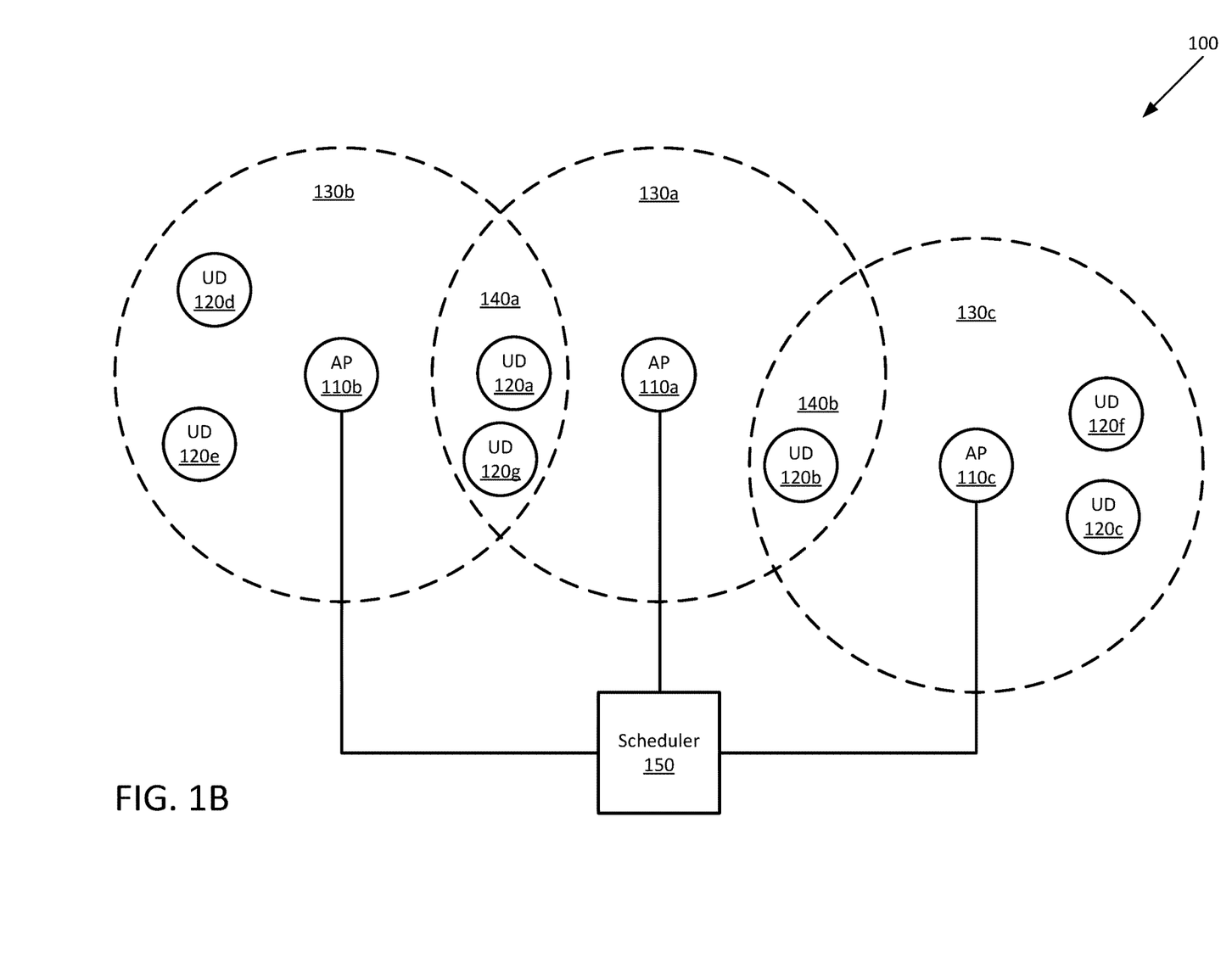

FIGS. 1A and 1B illustrate networking environments 100, according to embodiments of the present disclosure. As illustrated in FIGS. 1As and 1B, a plurality of APs 110a-c (generally, AP 110) serve various user devices (UD) 120a-g (generally, UD 120) located within the ranges 130a-c (generally, range 130) of the respective APs 110a-c. As illustrated, the ranges 130 define several overlapping areas 140a-d (generally, overlapping area 140) in which a UD 120 located in an overlapping area 140 may communicate with more than one AP 110. Conversely, UDs 120 are located within one range 130 (i.e., not in an overlapping area 140), and thus may directly communicate with one AP 110.

For example, as in FIG. 1A, a first UD 120a located in a first overlapping area 140a is located in the first through third ranges 130a-c and may send signals to and receive signals from the first through third APs 110a-c. A second UD 120b located in a second overlapping area 140b is located in both the first range 130a and the second range 130b (but not the third range 130c) and may send signals to and receive signals from the first AP 110a and the second AP 110b (but not the third AP 110c). Although a given number of APs 110 and UDs 120 are illustrated in FIG. 1A in various locations relative to the ranges 130 of the APs 110, more or fewer APs 110 and UDs 120 may be present in a networking environment 100 and in different locations than are illustrated in FIG. 1A.

In a further example, as in FIG. 1B, a first AP 110a may have a first range 130a with a first overlapping area 140a shared with a second AP 110b and a second overlapping area 140b shared with a third AP 110c, where the overlapping areas 140 are non-contiguous. A UD 120 located in an overlapping area 140 may be associated with any one of the APs 110 whose range 130 forms the overlapping area 140. For example, in FIG. 1B, the first UD 120a and the seventh UD 120g in the first overlapping area 140a may both be associated with (and served by) the first AP 110a or the second AP 110b, or one may be associated with the first AP 110a and the other with the second AP 110b.

In some embodiments, a scheduler 150 (e.g., a network controller) is in communication with the APs 110 to manage a shared network offered by the APs 110 within the networking environment. The scheduler 150 can be included in an AP 110 or may be provided by a separate computing device. In various embodiments, the scheduler 150 is in communication with the APs 110 via a wired connection (e.g., via wired network interface) or may be in communication via wireless communications between the APs 110 (e.g., by control frame messages). Example hardware as may be included in an scheduler 150 is discussed in greater detail in regard to FIG. 6.

An AP 110 may include various networking devices configured to provide wireless networks according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in an AP 110 is discussed in greater detail in regard to FIG. 6.

Similarly, a UD 120 may include any computing device that is configured to wirelessly connect to one or more APs 110. Example UDs 120 can include, but are not limited to: smart phones, feature phones, tablet computers, laptop computers, desktop computers, Internet of Things (IoT) devices, and the like. Example hardware as may be included in a UD 120 is discussed in greater detail in regard to FIG. 6.

Depending on the various communications standards used by the APs 110 and UDs 120 to wirelessly communicate, the transmissions between the APs 110 and the UD 120 may be carried in various frequency bands on various channels (and sub-channels) at various times to avoid collisions or interference in the overlapping areas 140. For example, a first AP 110a, a second AP 110b, and a third AP 110c may each communicate over a shared channel at different times, or may communicate at the same time (i.e., a shared time) on different channels. The devices in a network environment 100 can contend for access (or be scheduled access by a scheduler 150) to various portions of the available transmission medium, including spectrum and time.

As discussed herein, the portion of spectrum and time won in contention is referred to as an RU. An RU may include various defined portions related to preambles, inter-frame spacing, and various protocol data units defined in various standards. However, for purposes of understanding, the present disclosure focuses on the portions of the RU used for transmitting data (e.g., payloads) between APs 110 and UDs 120, and one of ordinary skill in the art will be able to apply the formatting, error correction/mitigation, and spacing specified by the relevant standards. Although the present disclosure generally provides examples for RUs of an unspecified time length or unspecified number of sub-channels or subcarriers (in which a given RU may be a different length of time or different number of sub-channels than a subsequent RU), the present disclosure is applicable to networking standards or deployments in which a specified time length or a specified number of sub-channels or sub-carriers is applied to all or some of the RUs.

Some devices in the network environment 100, in response to winning an RU, reserve the RU for individual-access to communicate with a single partner (e.g., a first UD 120a communicating with a first AP 110a). Some other devices in the network environment 100, in response to winning an RU, reserve the RU for multi-access communications. Multi-access communications assign various sub-channels of the RU for transmitting or receiving multiple streams of data to one or more targets during the RU. For example, a first AP 110a can assign a first sub-channel to communicate with a first UD 120a and assign a second and a third sub-channel to communication with a second UD 120b. Various devices in the network environment 100 can choose whether to use the transmission medium for individual-access or for multi-access communications, and may change between whether individual-access or multi-access communications are used for a given RU. Additionally, a device may use a given RU for uplink communication, downlink communications, or duplex communications (i.e., both uplink and downlink communications).

Figure 2A:
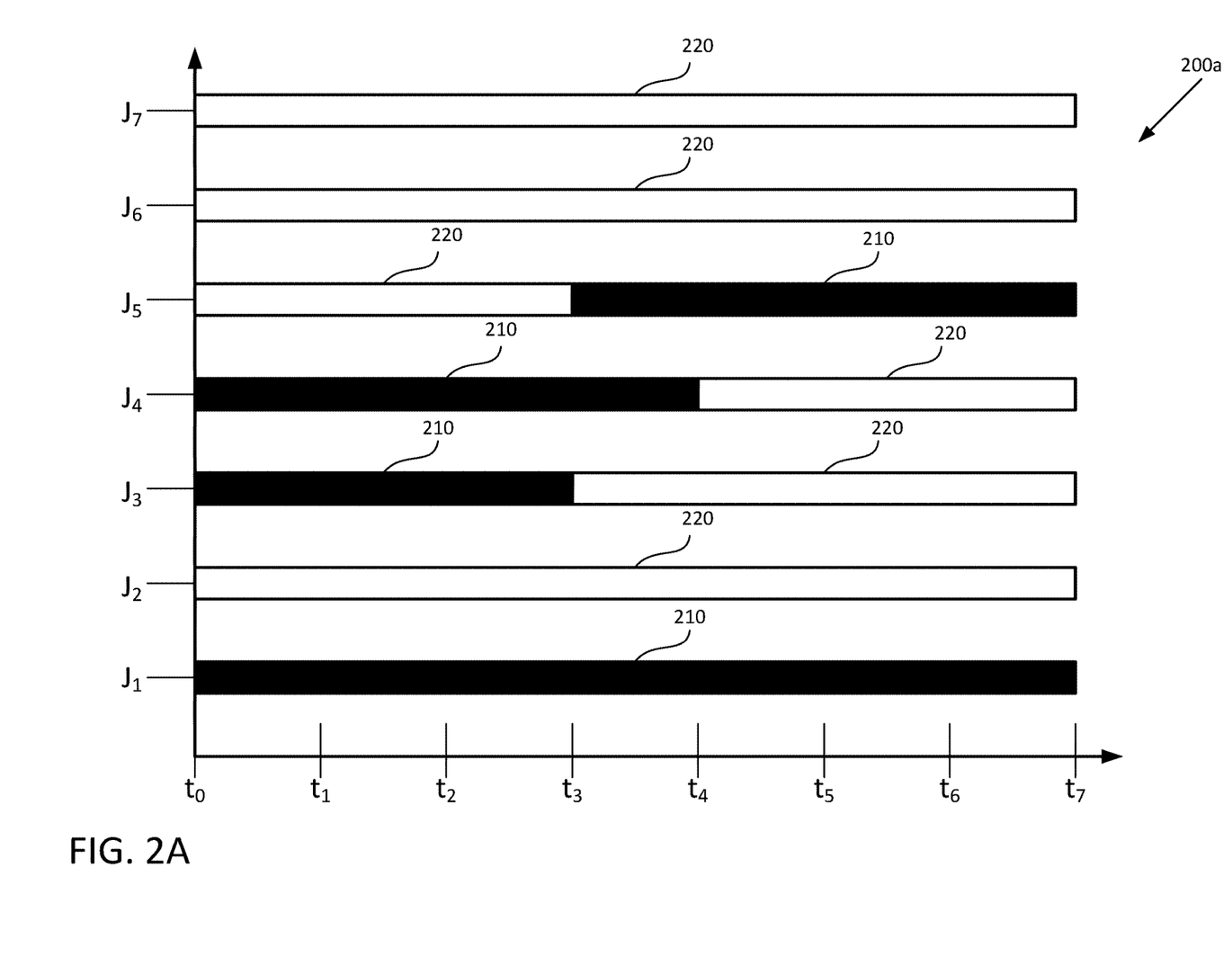
FIGS. 2A and 2B illustrate RU assignments for multi-access communications, according to embodiments of the present disclosure.
Figure 2B:
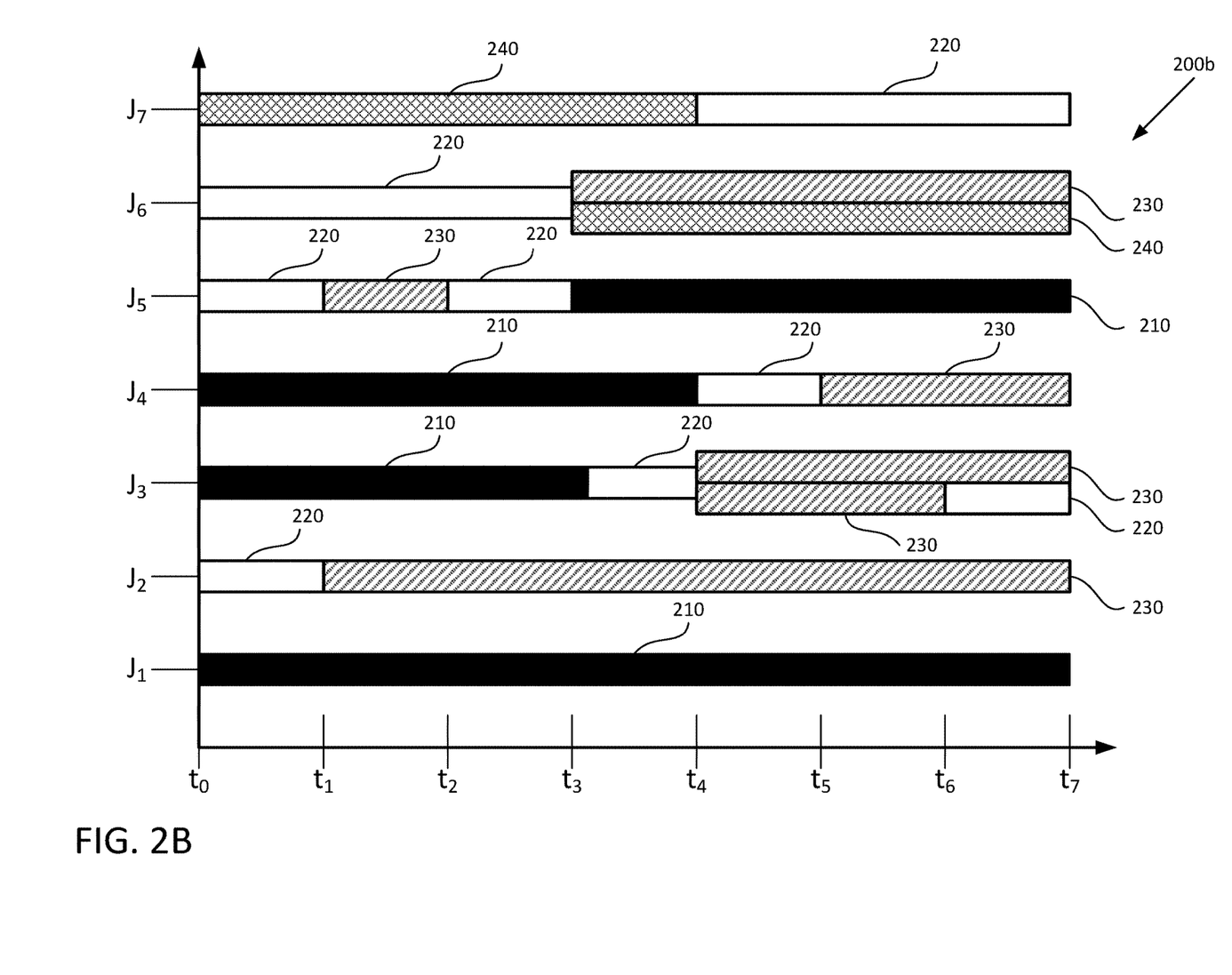

FIGS. 2A and 2B illustrate RU assignments 200a and 200b, respectively, for multi-access communications, according to embodiments of the present disclosure. As illustrated, the RU includes seven sub-channels $J_1$-$J_7$, and lasts from a beginning time of $t_0$ to an end time of $t_7$, although in various embodiments more than or fewer than seven sub-channels or a longer or shorter time duration may be included in the RU.

FIG. 2A illustrates a first RU assignment 200a, in which a first AP 110a, having won contention or having been scheduled an RU, assigns traffic for communicating with one or more devices on various sub-channels of the RU. In FIG. 2A, the first AP 110a has assigned traffic to sub-channel $J^1$ from time $t_0$ to $t_7$, to sub-channel $J_3$ from time $t_0$ to time $t_3$, to sub-channel $J_4$ from time $t_0$ to time $t_4$, and to sub-channel $J_5$ from time $t_3$ to time $t_7$, which collectively refer to an assigned portion 210 of the RU. In contrast, the unused portion 220 refers to those channels or portions of channels to which the first AP 110a has not assigned traffic. In FIG. 2A, the unused portion 220 includes sub-channel $J_2$ from time $t_0$ to time $t_7$, sub-channel $J_3$ from time $t_3$ to time $t_7$, sub-channel $J_4$ from time $t_4$ to time $t_7$, sub-channel $J_5$ from time $t_0$ to time $t_3$, sub-channel $J_6$ from time $t_0$ to time $t_7$, and sub-channel $J_7$ from time $t_0$ to time $t_7$.

In FIG. 2A, sub-channels $J_2$, $J_6$, and $J_7$ are clear sub-channels, as the first AP 110a has not assigned traffic to these sub-channels. In contrast, sub-channels $J_3$, $J_4$, and $J_5$ are partially occupied sub-channels, and sub-channel $J_1$ is a fully occupied sub-channel based on the assignment of traffic to these channels. Both the clear sub-channels and the partially occupied sub-channels represent unused transmission opportunities—either for uplink messages or downlink messages. The first AP 110a may leave portions of the RU unused when the first AP 110a and the associated UDs 120 do not enough data to fill all of the sub-channels or when the first AP 110a offers to share RUs with neighboring APs 110 to load balance or prioritize traffic handled by those APs 110.

FIG. 2B illustrates a second RU assignment 200b, in which the first AP 110a has shared access to the RU with other APs 110, and has scheduled when those other APs 110 may send or receive communications. In various embodiments, when two or more other APs 110 neighbor the first AP 110a, those other APs 110 may contend for access to the unused portions 220 from the first RU assignment 200a or may be scheduled by the first AP 110 (or an external scheduler 150) for access to the unused portions 220. Similarly, any unused portions 220 leftover after allowing a second AP 110b to assign traffic to the unused portions 220 may be made available to other APs 110. The unused portions 220 may remain available for sharing until the available bandwidth during the RU is fully assigned, until a duration of any remaining bandwidth is too short for an AP 110 to use, or until a request time period closes.

Comparing FIG. 2A to FIG. 2B, the assigned portions 210 for traffic handled by the first AP 110a remain the same, but the unused portions 220 have been partially filled by shared portions 230 handling traffic for the other APs 110 and assisted portions 240. Each of the sub-portions of the RU used by other APs 110 begin after the start time of the RU (e.g., time $t_1$ or later) and end at or before the end time of the RU (e.g., at or before time $t_7$). As will be understood, a sub-portion of the RU refers to a portion of the RU that is less than the whole RU.

Sub-channel $J_2$ illustrates a shared portion 230 using a sub-set of the unused portion 220 from FIG. 2A. For example, a second AP 110b may use a sub-set of the available time in the clear sub-channel to transmit messages to a UD 120 associated with the second AP 110b. The other UD 120 may be located in a shared area 140 for the first AP 110a and the second AP 110b, or may be located outside of the shared area 140. The assignment of the shared portion 230 may leave some of the sub-channel as an unused portion 220 (e.g., from time to $t_0$ time $t_1$). For example, the remaining unused portion 220 can act as a buffer or give the first AP 110a time to invite the second AP 110b to share sub-channel $J_2$ and give the second AP 110b time to process the availability of the unused portions 220 and respond.

Sub-channel $J_3$ illustrates a shared portion 230 using a sub-set of the unused portion 220 from FIG. 2A in which spatial separation of two APs 110 allows the first AP 110a to share the unused portion of the sub-channel with the two APs 110. For example, consider a second AP 110b attempting to communicate with a second UD 120b and a third AP 110c attempting to communicate with a third UD 120c. When the third UD 120c and third AP 110c are outside of the range of the second AP 110b, the messages transmitted from the second AP 110b will not interfere (at the intended destination) with messages sent between the third AP 110c and the third UD 120c. Similarly, when the second UD 120b and second AP 110b are outside of the range of the third AP 110c, the messages transmitted from the third AP 110c will not interfere (at the intended destination) with messages sent between the second AP 110b and the second UD 120b. Accordingly, the first AP 110a may share a sub-set of the RU with more than one other AP 110 at the same time, when the other APs 110 do not interfere with one another or the respective UDs 120. As illustrated, the shared portions 230 for two different APs 110 may last for different amounts of time.

Sub-channels $J_4$ and $J_5$ illustrate that a shared portion 230 may be scheduled either after the assigned portion 210 occurs (as in sub-channel $J_4$) or before the assigned portion 210 occurs (as in sub-channel $J_5$). In embodiments in which a shared portion 230 precedes an assigned portion 210, some of the sub-channel between the shared portion 230 and the assigned portion 210 may be left unassigned (e.g., from time $t_2$ to time $t_3$) to act as a buffer between the transmissions of the two APs 110.

Sub-channels $J_6$ and $J_7$ illustrate assisted portions 240, in which the first AP 110a transmits messages to a UD 120 associated with another AP 110. For example, in relation to sub-channel $J_6$, a shared portion 230 (e.g., transmitted by a second AP 110b) may coincide with an assisted portion 240 so that both the first AP 110a and a second AP 110b co-transmit the same message to a UD 120 associated with the second AP 110b. In another example, in relation to sub-channel $J_7$ the first AP 110a may transmit a message on behalf of the second AP 110b to a UD 120 associated with the second AP 110b without the second AP 110b transmitting the message (e.g., when the UD 120 is in an overlapping area 140 for the first and second APs 110). In various embodiments, the message to be co-transmitted with or transmitted on behalf of the second AP 110b is transmitted to the first AP 110a via a wired connection or wireless connection before the RU begins (e.g., before time to). In some embodiments, when the message is transmitted over a wireless connection for transmittal in the assisted portion 240, the message is transmitted on a different channel than the RU occupies.

Each of the subsets of the RU used for handling traffic (e.g., the assigned portions 210, the shared portions 230, and the assisted portions 240) may handle uplink communications or downlink communications, and the directionality of communication on one sub-channel may be different than the directionality of communication on another sub-channel in the same RU. Additionally, communications from one AP 110 may be addressed to one target device (e.g., a single UD 120 via channels $J_1$, $J_3$, $J_4$, and $J_5$) as different streams on the different sub-channels, or may be addressed to several target devices (e.g., a first UD 120a via channel J1, a second UD 120b via channel $J_3$, $J_4$, and $J_5$).

Figure 3:
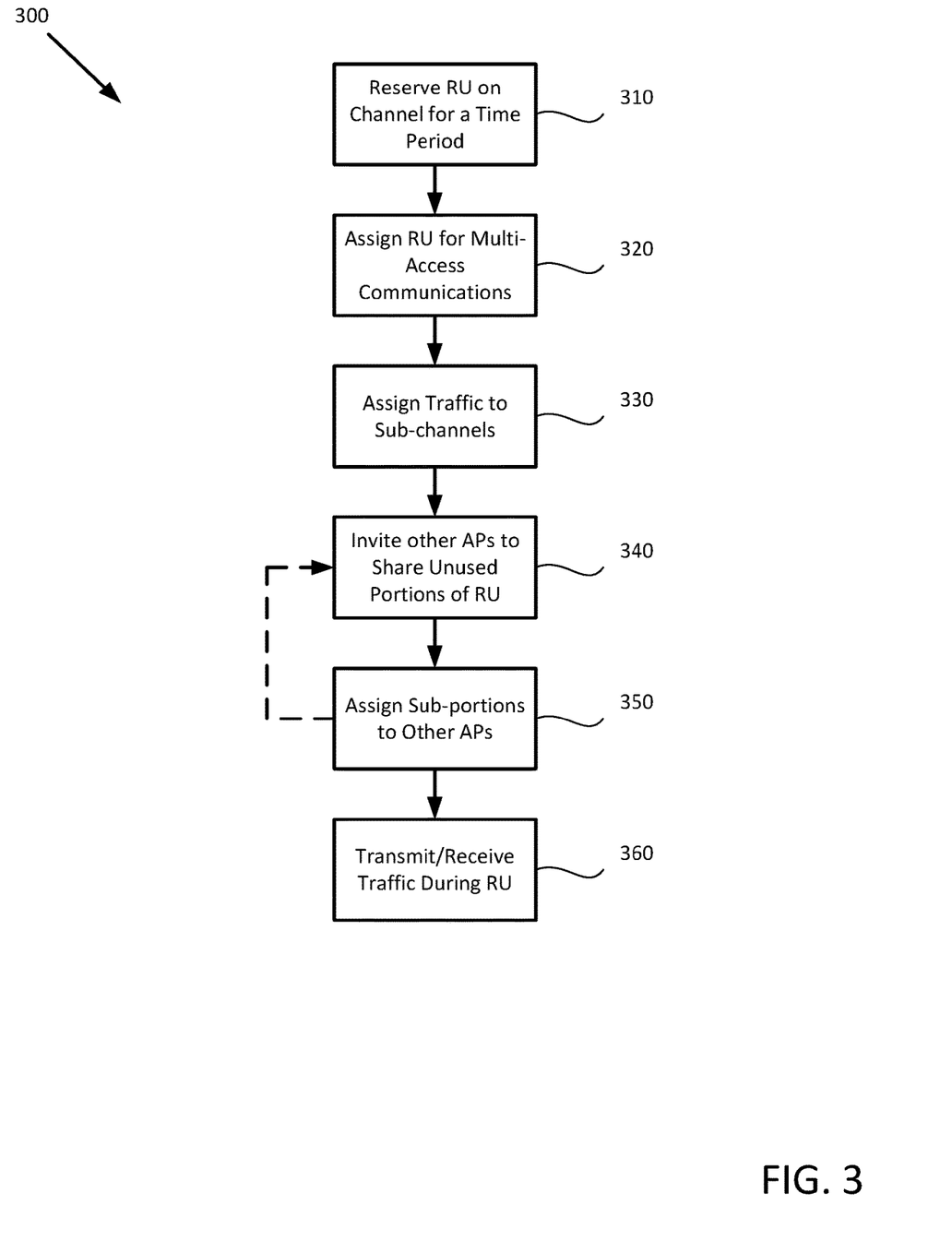
FIG. 3 is a flowchart of a method for RU sharing, according to embodiments of the present disclosure.

FIG. 3 is a flowchart of a method 300 for RU sharing, according to embodiments of the present disclosure. Method 300 begins at block 310 in response to a first AP 110a reserving an RU, thus having priority to a channel or frequency band for a known time period. In various embodiments, the first AP 110a reserves the RU via a contention process with other APs 110 in the network environment 100, or may be assigned the RU by a scheduler managing the APs 110. During contention, the first AP 110a requests an RU based on the requirements of the UDs 120 associated with the first AP 110a. In some embodiments, the controller or scheduler 150 also evaluates the performance parameters of the APs 110 neighboring the first AP 110a when determining whether to assign an RU to the first AP 110a to determine with the neighboring APs 110 are also ready to send/receive data and are capable of sharing the RU with the first AP 110a (e.g., after finishing a current transmission/reception). When the neighboring APs 110 are capable of sharing the RU, and have data to transmit/receive, the scheduler 150 can decide to allocate an RU to the first AP 110a that is larger than the first AP 110a initially requested, thus providing additional time and/or bandwidth in the RU to share with the neighboring APs 110 to transmit/receive data during that RU.

At block 320, the first AP 110a assigns the RU reserved in block 310 for multi-access communications, in which several sub-channels of the RU may be assigned for communicating with several different devices. In contrast, an AP 110 may also assign an RU for individual-access, in which the RU is used for communicating with one other device (e.g., sending messages to or receiving messages from one UD 120 or another AP 110).

At block 330, the first AP 110a assigns traffic to the sub-channels of the multi-access RU. In various embodiments, the traffic assignments may be for one or both of uplink communications (to the first AP 110a) or downlink communications (from the first AP 110a) and traffic to/from a given target may be assigned to one or more sub-channels in the RU.

At block 340, the first AP 110a invites other APs 110 to use the sub-portion of the RU not assigned for handling the traffic of the first AP 110a (i.e., the unused portions 220). In various embodiments, the first AP 110a invites the other APs 110 to share unused portions 220 via the preamble for the RU, which is broadcast to all devices by the first AP 110a. For example, the first AP 110 can broadcast the assigned portions 210 to the target devices in a preamble of the RU, and the other APs 110, having received the RU preamble, interpret the gaps in the assigned portions 210 to be an invitation to contend for or request the use of the unused portions 220. In some embodiments, the invitation is transmitted to the other APs 110 (wirelessly or via a wired connection) as a specific message that identifies the unused portions 220 to the other APs 110. Generally, the invitation identifies a beginning time of the RU, an end time of the RU (a duration from the beginning time or a specified time to end) and any available time spans on one or more sub-channels so that the other APs 110 can identify an available sub-channel at an available time that does not precede or extend beyond the RU. Stated differently, the shared portions 230 of the RU begin after the RU begins and end when or before the RU ends.

In various embodiments, when a first AP 110a invites another AP 110 to share an RU won by the first AP 110a, the invited AP 110 may decide (and indicate to the first AP 110a or a scheduler 150 of the decision) at or before the time when the RU begins, or at a time during the RU. For example, a second AP 110b and a third AP 110c may both be invited to share an RU won by a first AP 110a lasting from time to $t_0$ time $t_8$. The second AP 110b may indicate at or before time to that the second AP 110b will reserve an unused portion 220 (e.g., from time $t_1$ to time $t_4$) as a shared portion. The third AP 110c, however, may determine after time $t_0$ to assign traffic to an unused portion 220 of the RU, and may reserve a shared portion 230 at time $t_3$ for times $t_5$-$t_8$. For example, the third AP 110c in the present example may receive priority traffic after time $t_0$, conclude a transmission on a different channel but still have data to send/receive after time $t_0$, or take until after time $t_0$ to process the invitation or win contention for a given unused portion 220. In various embodiments, the first AP 110a or the scheduler 150 may allow other APs 110 to reserve portions of the RU after the RU begins by leaving the invitation open for a predefined amount of time (e.g., x ms after sending the invitation), allowing reservations until a given time before the end time of the RU (e.g., x ms before the end of the RU), or allowing reservations until a predefined time after the RU begins (e.g., no assignments after time $t_{0+x}$).

In embodiments in which invited APs 110 may reserve portions of the RU after the RU begins, the first AP 110a, the scheduler 150, or other APs 110 having reserved a portion of the shared RU may update the invitation to indicate what portions of the RU remain unused portions 220 and/or what portions are now shared portions 230 or assisted portions 240.

In various embodiments, when a given AP 110 (or UD 120) in the network environment 100 is only capable of transmitting in an individual access mode, the first AP 110a may avoid sending a directed invitation to the given AP 110 so that the given AP 110 does not attempt to communicate during the RU. In some embodiments, the first AP 110a may send a Quiet Time Period command to the given AP 110 (or UD 120) to request that the given AP 110 not communicate on the channels during the time of the RU.

At block 350, the first AP 110a assigns available sub-portions of the RU to the other APs 110 to use for multi-access communications. In various embodiments, the other APs 110 contend for access to the unused portions 220, and the first AP 110a (or a scheduler 150) assigns which sub-portions of the RU are assigned to the other APs 110. In various embodiments, the scheduler 150 of the first AP 110a (that initially won the RU) can break contention between the other APs 110 seeking to share the RU using various policies including giving preference to higher-priority traffic (e.g., latency sensitive traffic), higher-priority devices (e.g., employees versus guests), or the like. In various embodiments, the shared portions 230 may occupy clear sub-channels or partially occupied channels (either before or after the assigned portion 210 occurs). In some embodiments, the same unused portion 220 may be assigned to different APs 110 that are serving different UD 120 that are not located within the range 130 of the other AP 110. The shared portions 230 may occur on more or fewer sub-channels than the assigned portions 210, and may last for various durations.

The unused portions 220 of the RU may be shared until the available bandwidth during the RU is fully assigned, until a duration of any remaining bandwidth is too short for an AP 110 to use, or until a request time period closes. For example, in some embodiments, the first AP 110a shares some of the RU with a second AP 110b, which then shares any remaining unused portions 220 with the other APs 110. Stated differently, the second AP 110b can perform a parallel iteration of method 300 using a subset of the RU used by neither the first AP 110a nor the second AP 110b as the unused portion. In some embodiments, the first AP 110a retains control of the sub-portions of the RU not used by the first AP 110a or a second AP 110b, and method 300 may return to block 340 from block 350 to invite a third AP 110c (or subsequent AP) to share the RU.

At block 360, the first AP 110a transmits and/or receives communications on the assigned portions 210 of the RU.

Similarly, the other APs 110 with which the first AP 110a is sharing access to the RU transmit and/or receive communications on the shared portions 230 of the RU at block 360.

In various embodiments, the first AP 110a, if a message to co-transmit with a second AP 110b or to transmit on behalf of a second AP 110b has been received, can transmit that message during an assisted portion 240 of the RU during block 360. In some embodiments, when co-transmitting with or transmitting on behalf of the second AP 110b, the first AP 110a can alter the header of the frames destined for the target device to indicate that the origin of the message is the second AP 110b, despite the first AP 110a transmitting the message. In other embodiments, during initial negotiation between a UD 120 and an AP 110, one or more of the APs 110 indicate to the target device that data may be received from different or multiple APs 110 when the UD 120 is located in an overlapping area 140, and the header of the frames may remain unmodified (i.e., indicate the actual transmitting AP 110) when the first AP 110a co-transmits with or transmitting on behalf of the second AP 110b. Method 300 may then conclude.

Figure 4:
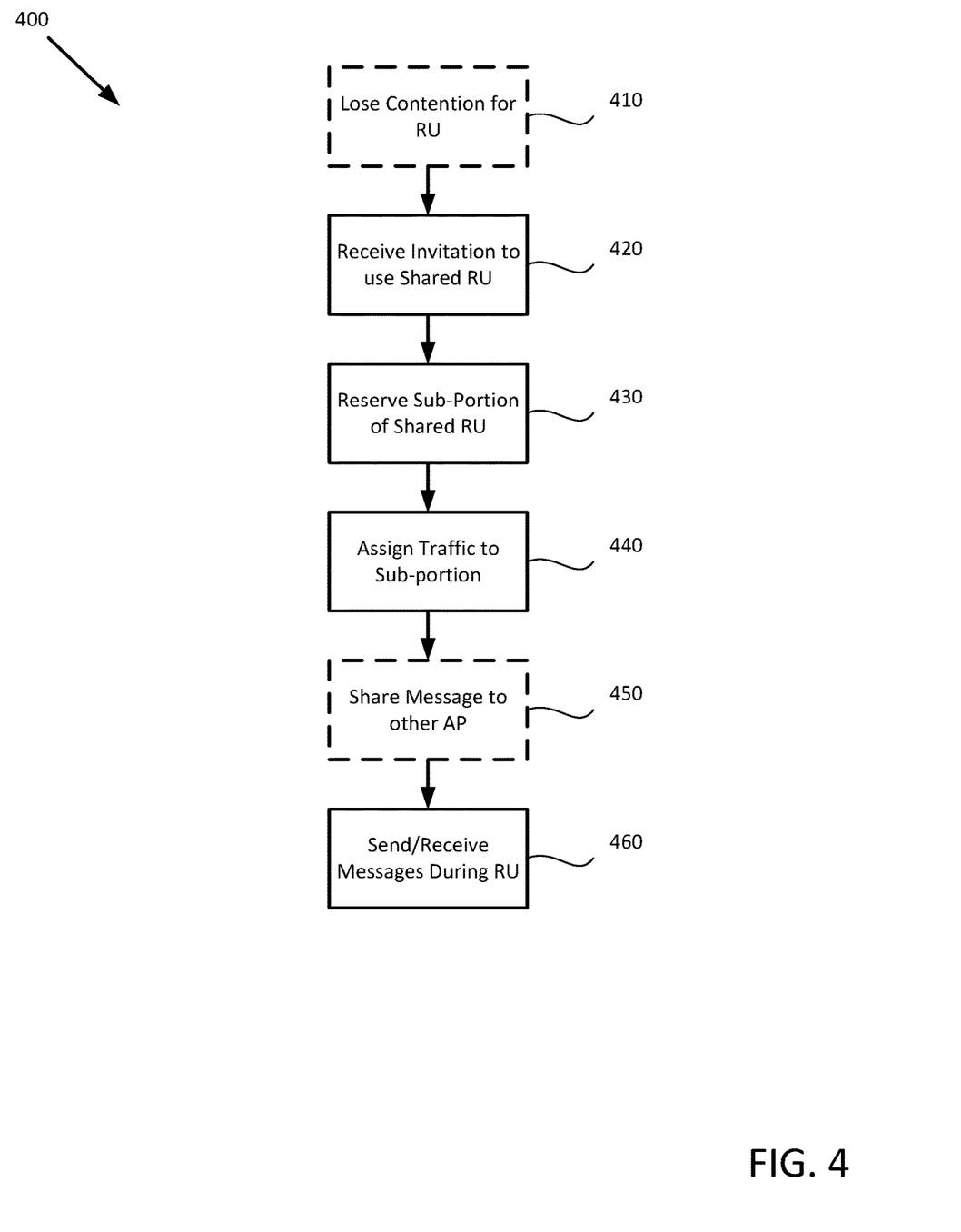
FIG. 4 is a flowchart of a method for RU sharing, according to embodiments of the present disclosure.

FIG. 4 is a flowchart of a method 400 for RU sharing, according to embodiments of the present disclosure. Method 400 begins at block 420 when a second AP 110b receives an invitation to use a shared RU won by a first AP 110a in a shared network environment 100. In various embodiments, the invitation is received as a specific message (e.g., in a control frame) that identifies when the RU begins, ends, the sub-channels and when those sub-channels are unoccupied. In some embodiments, the invitation is received as the preamble to the RU, which identifies when the RU begins, ends, and the assigned portions 210 of the RU.

In some embodiments, before block 420 occurs, method 400 includes block 410, where the second AP 110b loses contention for the channel and time that the shared RU occupies. For example, the second AP 110b may contend to use a given channel for at least some of the time that the RU occupies, but the channel and time are won by the first AP 110a, which then shares any unused portions 220 with the second AP 110b. In other embodiments, the second AP 110b may be invited to use, and then share access to an RU won by a first AP 110a in a time or on a channel that the second AP 110b did not initially contend for, and method 400 may omit block 410.

At block 430, the second AP 110b reserves a sub-portion of the shared RU that is unoccupied by other APs 110. The second AP 110b may contend for access (whether assigned concurrently or sequentially) to the unused portions 220. In various embodiments, the second AP 110b is given access to some or all of the unused portions 220 before a third AP 110c is given access to the unused portions 220, after a third AP 110c is given access to the unused portions 220, or concurrently to a third AP 110c being given access to the unused portions 220. The second AP 110b requests a sub-portion of the share RU to handle traffic with various UDs 120 associated with the second AP 110b, including uplink, downlink, and/or bi-directional traffic. In various embodiments, once the second AP 110b has reserved a sub-portion of the RU, the first AP 110a or a scheduler 150 prevents other APs 110 from also reserving an overlapping sub-portion of the RU (unless those APs 110 are serving UDs 120 in non-overlapping ranges 130).

In various embodiments, the shared portions 230 that the second AP 110 has reserved for handling traffic may occur on a given sub-channel that is clear of assigned portions 210 or is partially clear. On a partially clear sub-channel, a shared portion 230 may occur before an assigned portion 210, after an assigned portion 210, or between two assigned portions 210.

At block 440, the second AP 110b assigns traffic to the sub-portion(s) reserved in block 430. In various embodiments, the second AP 110b prioritizes which traffic is assigned to the reserved sub-portions based on the priority of the traffic, which may include the latency sensitivity of the traffic, how full a buffer for the traffic is, a priority level or guaranteed service level for the connection, etc. The second AP 110b transmits the assignments to the various UDs 120 to alert the UDs 120 to be ready to transmit and/or receive messages on the various reserved sub-channels at the various reserved times. In various embodiments, the assignments are transmitted in a wireless broadcast.

Optionally, at block 450, the second AP 110b shares a message to the first AP 110a to transmit on the reserved sub-portions. In some embodiments, the shared message is to be transmitted by the first AP 110a (but not the second AP 110b) and the first AP 110a transmits the shared message on behalf of the second AP 110b in a shared portion 240. In some embodiments, the shared message is to be co-transmitted by the first AP 110a and the second AP 110b at the same time on the reserved sub-channel. In various embodiments, the second AP 110b wirelessly shares the message to the first AP 110a on a different channel than the RU occupies, and/or by a wired connection. When the second AP 110b instructs the first AP 110a to transmit the message on behalf of or co-transmit with of the second AP 110b, the first AP 110a can alter the header of the frames destined for the target device to indicate that the origin of the message is the second AP 110b. In other embodiments, during initial negotiation between a UD 120 and an AP 110, one or more of the APs 110 indicate to the target device that data may be received from different or multiple APs 110 when the UD 120 is located in an overlapping area 140, and the header of the frames may remain unmodified (i.e., indicate the actual transmitting AP 110) when the first AP 110a co-transmits with or transmitting on behalf of the second AP 110b.

At block 460, the second AP 110b transmits and/or receives communications on the shared portions 230 of the RU. Similarly, the other APs 110 with which the first AP 110a is sharing access to the RU transmit and/or receive communications on assigned portions 210 or the shared portions 230 of the RU at block 460. In various embodiments, the first AP 110a, if a message to co-transmit with or to transmit on behalf of a second AP 110b has been received, can transmit that message during an assisted portion 240 of the RU during block 460. Method 400 may then conclude.

Figure 5:
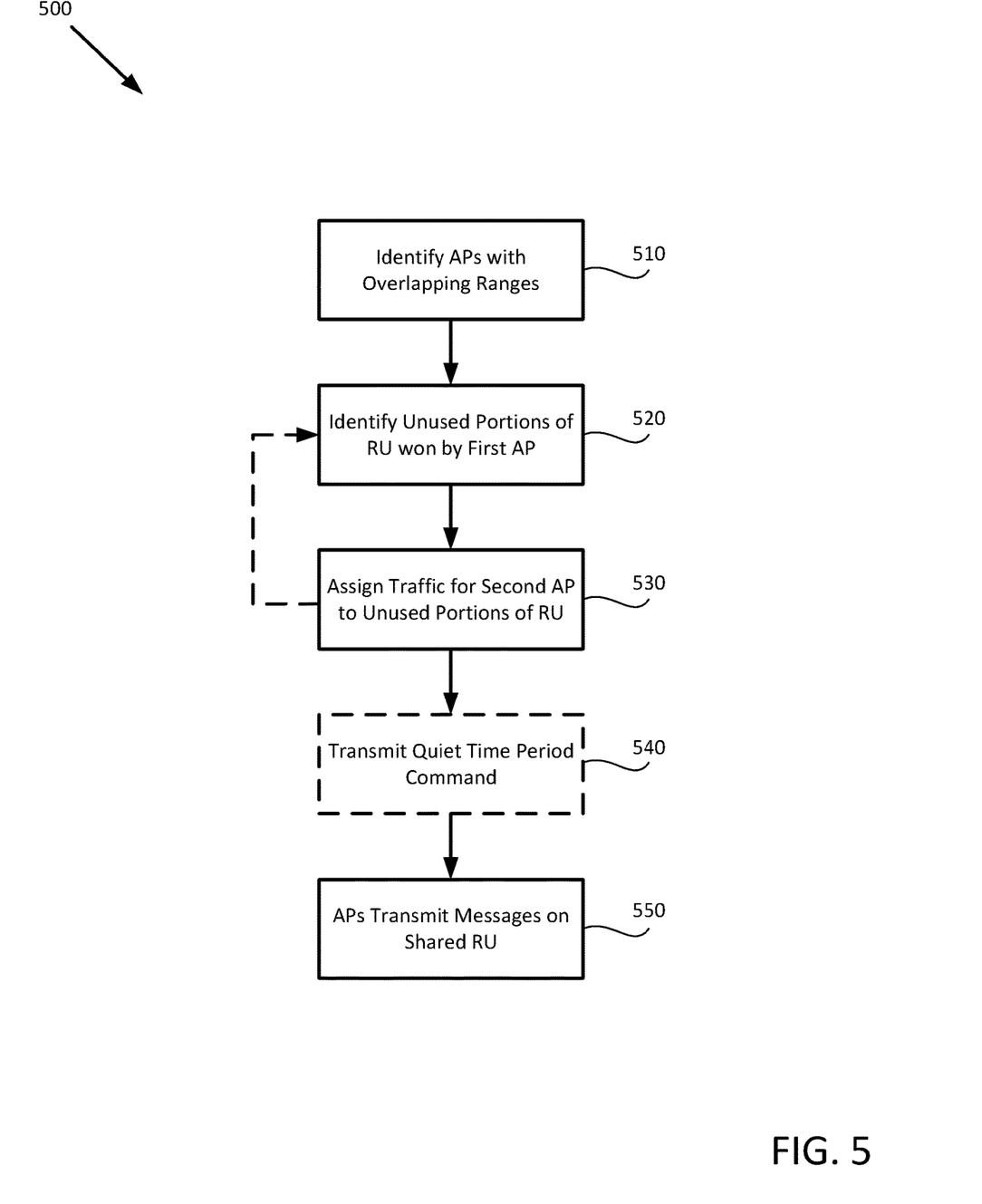
FIG. 5 is a flowchart of a method for RU sharing, according to embodiments of the present disclosure.

FIG. 5 is a flowchart of a method 500 for RU sharing, according to embodiments of the present disclosure. Method 500 begins at block 510, where a scheduler 150 (or a master AP 110 in the network environment 100) identifies the AP 110 with overlapping ranges 130 and the UDs 120 associated with those APs 110. For example, the scheduler 150 identifies a first AP 110a associated with a first UD 120a, and a second AP 110b associated with a second UD 120b located in an overlapping area 140 for the first and second APs 110.

At block 520, the scheduler 150 identifies unused portions 220 of an RU won by the first AP 110a, and at block 530 assigns at least some of those unused portions 220 to the second AP 110b for use as shared portions 230, which the second AP 110b can use to communicate with the second UD 120b. In various embodiments, the second AP 110b or the scheduler 150 communicates the assignments to the second UD 120b. In some embodiments, the scheduler 150 may repeat block 520 and block 530 for subsequent APs 110 to assign sub-portions of the RU not used by other APs 110 to the subsequent APs 110 (e.g., a third AP 110c). In some embodiments a scheduler 150 may provide a bigger RU to AP 110a than what the AP 110 had asked for after analyzing various performance parameters (such as buffer depths for pending packets for devices that are in the overlapping area 140) and this over-assignment may allow increased opportunities for other neighboring APs 110 that also need to serve packets in the overlapping area 140. For example, the scheduler 150 can assign an RU with a longer time duration and/or with a greater number of sub-channels than the first AP 110a that won the RU in contention needs to serve the UDs 120 associated with the first AP 110a, thus providing opportunities to share unused portions 220 of that RU with one or more neighboring APs 110. Accordingly, an AP 110 may request an RU for a duration of X ms and/or occupying Y channels, but the scheduler 150 over-assigns the RU to have a duration of X+A ms and/or Y+B channels to provide additional capacity for the AP 110 to share.

Optionally, at block 540, the scheduler 150 transmits a Quiet Time Period command to one or more APs 110 that are not scheduled to communicate during the RU to ensure that those APS 110 do not attempt to communicate on the channel used by the RU for the duration of the RU.

At block 550, the scheduler 150 permits the APs 110 to transmit or receive communications over the scheduled sub-channels for the scheduled times. Method 500 may then conclude.

Figure 6:
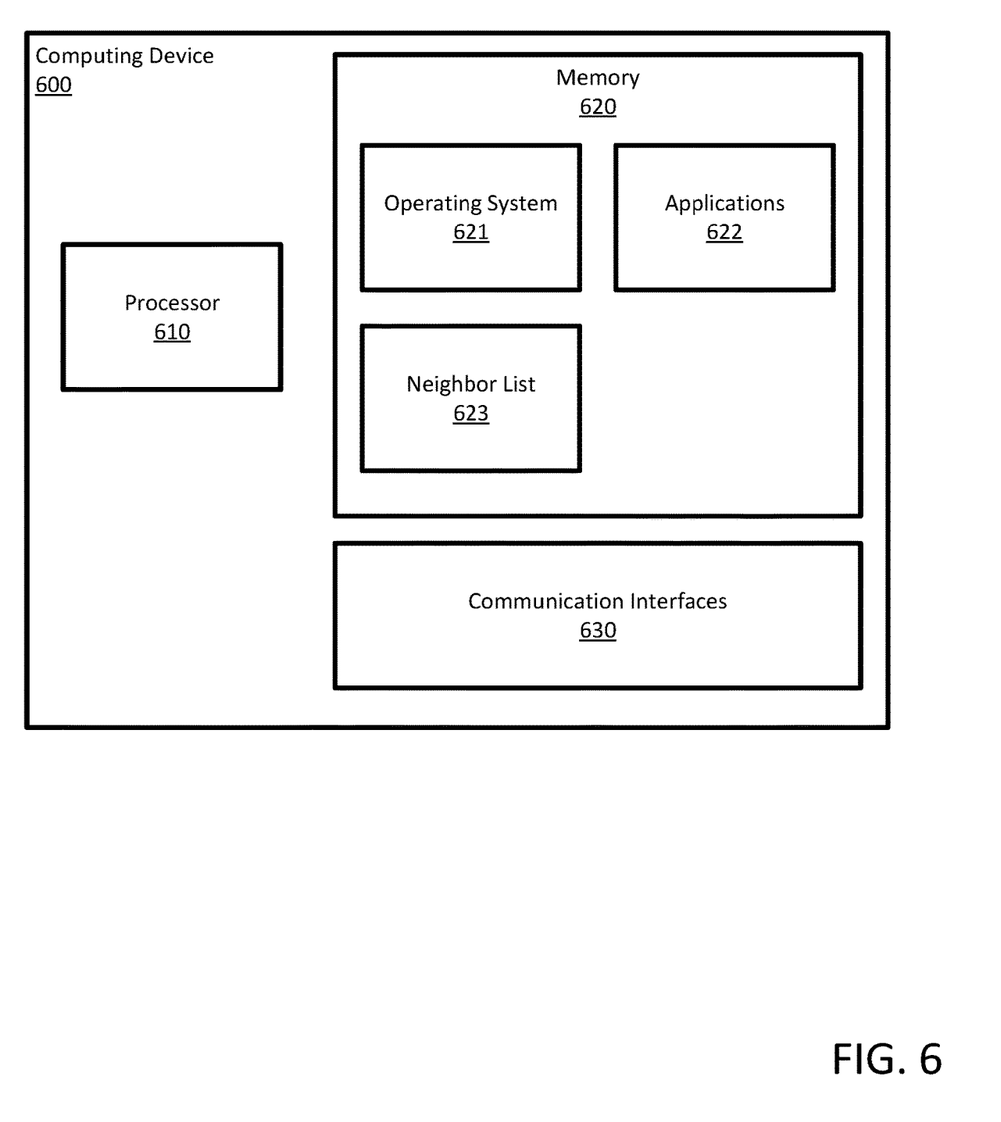
FIG. 6 illustrates hardware of a computing device, according to embodiments of the present disclosure.

FIG. 6 illustrates hardware of a computing device 600, as may be used in an AP 110, a UD 120, or scheduler 150 described in the present disclosure. The computing device 600 includes a processor 610, a memory 620, and communication interfaces 630. The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communications interfaces 630 are representative of wireless communications antennas and various wired communication ports. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 621 to manage various functions of the computing device 600 and one or more applications 622 to provide various functionalities to users of the computing device 600, which include one or more of the functions and functionalities described in the present disclosure. Additionally, the memory 620 includes one or more of a neighbor list 623 indicating what APs 110 can (or are expected to) may request or offer to share an RU. The neighbor list 623 may include details for the neighboring APs 110 such as MAC address, signaling capabilities, extend of an associated range 130, etc., to enable the computing device 600 to determine where an overlapping area 140 exists, whether two APs 110 have contiguous ranges 130, and what information to include in a header or preamble when handling a shared message in an assisted portion 240 of an RU.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   reserving, by a first Access Point (AP) a Resource Unit (RU) for use in an environment including an overlapping area served by the first AP and a second AP;
   assigning traffic between a first user device and the first AP in the RU;
   transmitting an invitation to the second AP that identifies an unused portion of the RU;
   assigning a sub-portion of the unused portion to the second AP;
   transmitting, by the first AP, the traffic to the first user device not using the sub-portion during the RU; and
   co-transmitting, by the first AP, a message to a second user device associated with the second AP while the second AP transmits the message to the second user device using the sub-portion.

2. The method of claim 1, wherein the invitation identifies:
   a beginning time of the RU;
   an end time of the RU; and
   an available sub-channel during the unused portion; and
   wherein the sub-portion occupies the available sub-channel at a time that starts after the beginning time and ends at or before the end time.

3. The method of claim 1, further comprising:
   receiving the message from the second AP for transmittal to the second user device associated with the second AP during the sub-portion; and
   transmitting, by the first AP, the message to the second user device on behalf of the second AP.

4. The method of claim 1, further comprising:
   assigning traffic between a third user device and the first AP in the RU; and
   wherein first messages between the first AP and the first user device and second messages between the first AP the third user device are transmitted at a shared time on different sub-channels.

5. The method of claim 4, wherein the first is messages are transmitted on a different number of sub-channels than the second messages.

6. The method of claim 4, wherein the first messages are transmitted for a different length of time than the second messages.

7. The method of claim 1, wherein the unused portion includes a sub-channel to which the traffic is assigned in the RU for times before the unused portion is scheduled to occur.

8. The method of claim 1, wherein the traffic includes at least one of an uplink message and a downlink message.

9. A method, comprising:
   receiving, at a first Access Point (AP) an invitation from a second AP that has reserved a channel for a time period to share an unused portion of the channel for the time period;
   reserving a sub-portion during the unused portion, wherein the sub-portion begins after the time period begins and ends at or before when the time period ends;
   assigning traffic associated with the first AP to the sub-portion;
   transmitting, by the first AP, to the second AP, a downlink message destined for a first user device associated with the first AP that is part of the traffic assigned to the sub-portion; and
   co-transmitting, by the first AP, with the second AP, the downlink message to the first user device.

10. The method of claim 9, further comprising at least one of:
    transmitting downlink messages to a user device during the sub-portion; and
    receiving an uplink message from the user device during the sub-portion.

11. The method of claim 9, wherein the sub-portion is reserved on a partially occupied sub-channel, wherein the sub-portion occupies a time range in the partially occupied sub-channel outside of which the second AP has assigned traffic to the partially occupied sub-channel.

12. A method, comprising:
    identifying a first Access Point (AP) associated with a first user device, wherein the first AP has won contention for a Resource Unit (RU);
    identifying a second AP associated with a second user device, wherein the first user device and the second user device are located within an overlapping area served by the first AP and the second AP;
    identifying an unused portion of the RU to which the first AP has not scheduled traffic between the first AP and the first user device;

assigning the unused portion to the second AP for communications between the second AP and the second user device;
identifying a third AP associated with a third user device, wherein the first user device and the third user device are located within a second overlapping area served by the first AP and the third AP, and wherein a connection between the third AP and the third user device does not support scheduled access; and
transmitting a Quiet Time Period command to at least one of the third AP and the third user device that identifies a time period of the RU.

13. The method of claim 12, wherein the communications between the second AP and the second user device include at least one of:
downlink messages from the second AP to the second user device; and
uplink messages from the second user device to the second AP.

14. The method of claim 12, wherein the RU won by the first AP is scheduled for over-assignment, wherein the RU is scheduled for at least one of a longer duration or a greater number of sub-channels than is requested by the first AP.

15. The method of claim 12, wherein the unused portion comprises a partially occupied sub-channel, wherein the unused portion occupies a time range in the partially occupied sub-channel outside of when the first AP has assigned traffic to the partially occupied sub-channel.

16. The method of claim 12, further comprising:
identifying the third AP associated with the third user device, wherein the first user device and the third user device are located within the second overlapping area served by the first AP, the second AP, and the third AP;
identifying a second unused portion of the RU to which the first AP has not scheduled traffic between the first AP and the first user device and to which the second AP has not scheduled traffic between the second AP and the second user device; and
assigning the second unused portion to the third AP for communication between the third AP and the third user device.

17. The method of claim 12, further comprising:
identifying the third AP associated with the third user device, wherein the first user device and the third user device are located within the second overlapping area served by the first AP and the third AP, but not the second AP; and
assigning the unused portion to the third AP for communication between the third AP and the third user device.

\* \* \* \* \*

UNITED STATES PATENT AND TRADEMARK OFFICE
CERTIFICATE OF CORRECTION

PATENT NO. : 11,375,411 B2
APPLICATION NO. : 16/752354
DATED : June 28, 2022
INVENTOR(S) : Mukesh Taneja et al.

Page 1 of 1

It is certified that error appears in the above-identified patent and that said Letters Patent is hereby corrected as shown below:

In the Specification

In Column 5, Line 60, delete "to $t_0$" and insert -- $t_0$ to --.

In Column 6, Line 37, delete "$J_7$" and insert -- $J_7$, --.

In Column 6, Line 45, delete "to)." and insert -- $t_0$). --.

In the Claims

In Column 14, Line 18, in Claim 5, after "first" delete "is".

Signed and Sealed this
Thirtieth Day of August, 2022

Katherine Kelly Vidal
*Director of the United States Patent and Trademark Office*